UNITED STATES PATENT OFFICE.

LEOPOLD GRAF, OF NEWARK, NEW JERSEY.

IMPROVEMENT IN THE MANUFACTURE OF PRUSSIAN BLUE.

Specification forming part of Letters Patent No. 213,189, dated March 11, 1879; application filed December 19, 1878.

*To all whom it may concern:*

Be it known that I, LEOPOLD GRAF, of Newark, in the county of Essex and State of New Jersey, have invented a new and useful Improvement in the Manufacture of Prussian Blue, which improvement is fully set forth in the following specification.

In the usual process for manufacturing prussiate of potash or ferrocyanide of potassium ($2KCy,FeCy+3HO$) are employed animal matters containing nitrogen, such as blood, hoofs, horn, hides, cracklings, woolen rags, hair, leather, and all nitrogenous offals, which are calcined in their dried state with potash, or previously charred in retorts and then fused with potash.

This process is desirable where ammoniacal products are to be obtained, and for this purpose the offals are distilled in iron retorts to catch the ammoniacal water and tarry matters, and the charcoal remaining is then thrown into the fused potash. It was found, however, that the less the offals were distilled the greater was the proportion of the prussiate obtained, and hence dried but uncharred offals have latterly been substituted for the animal charcoal.

The potash is brought to fusion in a suitable pot. The animal matter is thrown in gradually during several hours, the mass being frequently stirred with an iron paddle, until ammoniacal vapor is perceived, when the pot is closed and a brisk fire given, the pot being opened at intervals to stir the mass.

When the flame in the pot ceases, or carbonaceous matter has disappeared, the thick mass is drawn out from the pot, quickly cooled—apart from the air, if possible—dissolved by warm water, filtered, and the solution evaporated for crystallization.

To meet the excess of cyanide of potassium, copperas may be added.

A second solution and evaporation yield a good commercial prussiate of potash.

By adding a protosalt of iron to the ferrocyanide of potassium in solution, so that a portion of the latter remains undissolved, a white precipitate of ferrocyanide of potassium is formed, which, when exposed to the atmospheric air, absorbs oxygen and becomes blue, having the form $3FeCy2Fe_2Cy_3+Fe_2O_3$. It is basic Prussian blue or oxyferrocyanide of iron and Prussian blue, $3FeCy,2Fe_2Cy_3+2(Fe_2Cy_3)$.

My invention consists in first dissolving leather scraps in caustic alkali, then evaporating the solution to dryness, and melting the same together with iron filings in a suitable pot or crucible from which the air is excluded; then removing the mass from the pot, washing it out with hot water, and, after filtering the lye, transforming the same into Prussian blue.

In carrying out my invention, I take dry leather scraps, four pounds; caustic potash, two pounds; water, about two gallons. This mixture I place into a closed boiler, and heat the same until the pressure rises to about seventy pounds to the square inch, the heat being kept up from one to three hours. At the end of this time the leather has dissolved, and the contents of the boiler form a liquid mass. I then evaporate the liquid until the mass becomes perfectly dry, and add thereto a quantity of iron filings, in the proportion of about one pound of iron filings to five or six pounds of the dry mass. The mixture thus obtained is then fused in a pot or crucible from which the atmospheric air is excluded, and when the fusion is completed I draw the mass out of the pot or crucible and wash the same out with hot water. The lye obtained by this process is then filtered and transformed into Prussian blue.

For this purpose I supersaturate the lye above mentioned with sulphuric or other acid, and precipitate with persulphate of iron.

The lye contains $2KaCy,FeCy+$ excess of $KaOHO$ and $KaOCO_2$; by adding $SO_3$, I obtain $H_2Cy_3Fe+KaOSO_3+CO_2$; by adding persulphate of iron, ($Fe_2O_33SO_3$,) I obtain $2Fe_2Cy_3, 3FeCy$, which may also be expressed $Fe_4(Cy_3Fe)3$, or Prussian blue.

By my process of treating leather scraps as above described, a much greater yield of Prussian blue is effected than by the old processes, and the quality of the article is materially improved.

What I claim as new, and desire to secure by Letters Patent, is—

As an improvement in the manufacture of Prussian blue, the process of first producing a solution of leather scraps in caustic alkali, then evaporating this solution to dryness, mixing the mass with iron filings, fusing this mixture, washing the fused mass, and finally treating the lye with acid and persulphate of iron, substantially as hereinbefore set forth.

In testimony that I claim the foregoing I have hereunto set my hand and seal this 17th day of December, 1878.

LEOPOLD GRAF. [L. S.]

Witnesses:
 W. HAUFF,
 E. F. KASTENHUBER.